(12) United States Patent
Hwang

(10) Patent No.: US 7,698,468 B2  
(45) Date of Patent: Apr. 13, 2010

(54) SELECTIVE DEVICE RECOGNITION APPARATUS IN UPNP BASED HOME NETWORK AND METHOD THEREOF

(75) Inventor: Hye-Sook Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 1239 days.

(21) Appl. No.: 10/671,706

(22) Filed: Sep. 29, 2003

(65) Prior Publication Data

US 2004/0083303 A1    Apr. 29, 2004

(30) Foreign Application Priority Data

Oct. 1, 2002    (KR) .................. 10-2002-0059958

(51) Int. Cl.  
 *G06F 15/16* (2006.01)

(52) U.S. Cl. ........................................ 709/249

(58) Field of Classification Search ............... 709/227, 709/232, 249; 707/227  
See application file for complete search history.

(56) References Cited

U.S. PATENT DOCUMENTS

| | | | |
|---|---|---|---|
| 6,779,004 B1 * | 8/2004 | Zintel | 709/227 |
| 6,941,356 B2 * | 9/2005 | Meyerson | 709/220 |
| 6,970,869 B1 * | 11/2005 | Slaughter et al. | 707/10 |
| 7,376,723 B2 * | 5/2008 | Cho et al. | 709/223 |

* cited by examiner

*Primary Examiner*—Jeffrey Pwu  
*Assistant Examiner*—Farhad Ali  
(74) *Attorney, Agent, or Firm*—Birch, Stewart, Kolasch & Birch, LLP.

(57) ABSTRACT

In a selective device recognition apparatus in a UPnP based home network and a method thereof performing recognition of UPnP devices differentially according to UPnP CP user's authority, by providing a network transmission possible identifier to a request message in a UPnP CP, recognizing the network transmission possible identifier by a corresponded UPnP device and displaying it on a screen of the UPnP CP user, the user can recognize a pertinent home network device easily and can perform device security selectively through the selective device recognition.

15 Claims, 8 Drawing Sheets

```
M-SEARCH * HTTP/1.1
HOST: 239.255.255.250:1900
MAN: "ssdp: discover"
MX: seconds to delay response
ST: search target
```

```
NOTIFY * HTTP/1.1
HOST: 239.255.255.250:1900
CACHE-CONTROL: max-age=seconds until advertisement expires
LOCATION: URL for UPnP description for root device
NT: search target
NTS: ssdp: alive
SERVER: OS/version UPnP/1.0 product/version
USN: advertisement UUID
```

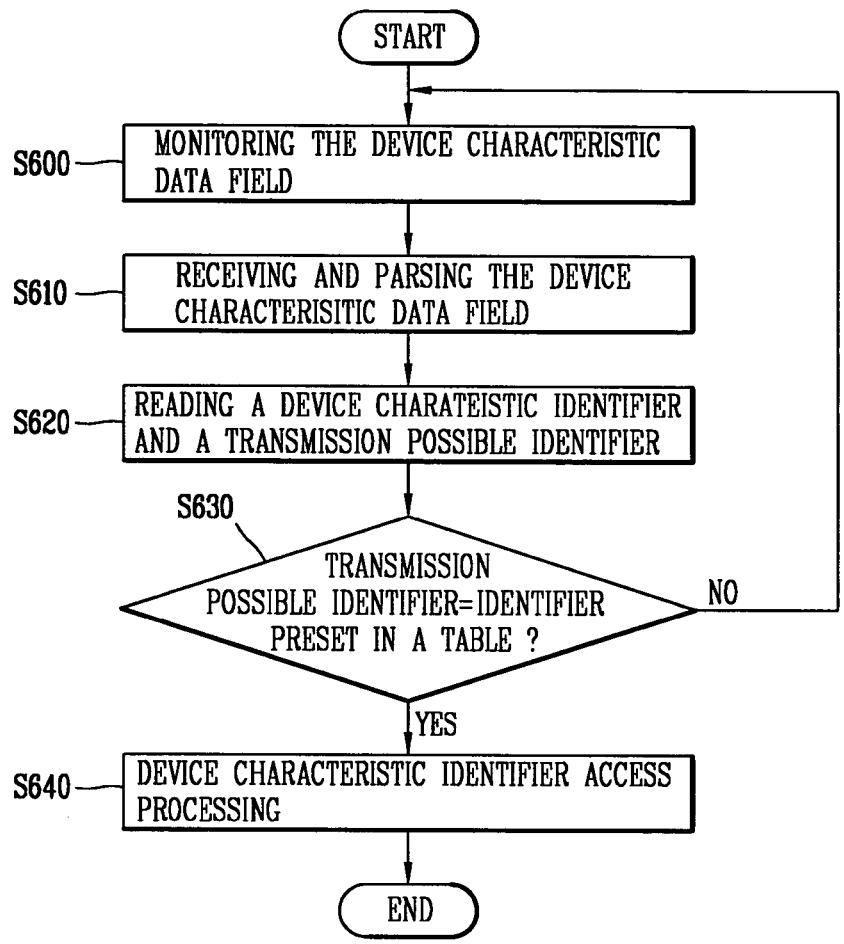

FIG. 10

| ST(DEVICE CHARACTERISTIC IDENTIFIER) | PW(NETWORK TRANSMISSION POSSIBLE IDENTIFIER) | RECOGNITION ITEM |
|---|---|---|
| SSDP : ALL | ALL : XXXXXXX | ALL DEVICES IN NETWORK |
| UPnP : ROOTDEVICE | UPnP : ZZZZZZZ | RECOGNZING ONLY A ROOT DEVICE |
| UUID : DEVICE-UUID | UUID : SSSSSSS | RECOGNIZING ONLY A SPECIFIC DEVICE |
| Urn : SCHEMAS-UPnP-ORG : DEVICE : DEVICE TYPE | Urn : DEVICE TYPE : TTTTTTT | RECOGNIZING ONLY A SPECIFIC DEVICE |
| Urn : SCHEMAS-UPnP-ORG : SERVICE : SERVICE TYPE | Urn : SERVICE TYPE : FFFFFFF | RECOGNIZING ONLY A SPECIFIC SERVICE TYPE |

FIG. 12

```
NOTIFY * HTTP/1.1
HOST : 239.255.255.250:1900
CACHE-CONTROL: max-age=seconds until advertisement expires
LOCATION: URL for UPnP description for root device
NT: search target
PW: authoorized key
NTS: ssdp: alive
SERVER: OS/version UPnP/1.0 product/version
USN: advertisement UUID
```

FIG. 13

| NT(DEVICE CHARACTEISTIC IDENTIFIER) | PW(NETWORK TRANSMISSION POSSIBLE IDENTIFIER) | DEVICE RECOGNITION ITEM |
|---|---|---|
| UPnP: ROOT DEVICE | UPnP: ZZZZZZZ | ADVETISING ONLY A ROOT DEVICE |
| UUID: DEVICE-UUID | UUID: SSSSSSS | ADVETISING ONLY A SPECIFIC DEVICE |
| URN: SCHEMAS-UPnP-ORG: DEVICE: DEVICE TYPE: V | URN: DEVICE TYPE: V: TTTTTTT | ADVETISING ONLY A SPECIFIC DEVICE TYPE |
| URN: SCHEMAS-UPnP-ORG: SERVICE: SERVICE TYPE: V | URN: SERVICE TYPE: V: FFFFFFF | ADVETISING ONLY A SPECIFIC SERVICE TYPE |

SELECTIVE DEVICE RECOGNITION APPARATUS IN UPNP BASED HOME NETWORK AND METHOD THEREOF

This nonprovisional application claims priority under 35 U.S.C. §119(a) on Patent Application No(s). 10-2002-0059958 filed in KOREA on Oct. 1, 2002, which is(are) herein incorporated by reference.

BACKGROUND OF THE INVENTION

1. Field of the Invention

The present invention relates to a home network, and in particular to a device recognition apparatus and a method thereof capable of performing selective recognition of a specific device according to authority grant of a user in a UPnP based home network.

2. Description of the Related Art

Recently, with the development of information technologies, not only a PC (personal computer) but also various IT products such as a digital television receiver, a PDA and a game board, etc. can be connected to a network as home network devices, and accordingly a home network comes into the spotlight.

In the home network, by connecting home network devices in a house with a topology, the home network devices own data commonly, and a user can perform broadband communication through them. In more detail, a home network in a narrow sense means wire and wireless network equipment connecting home network devices in a house, and a home network in a broad sense includes a middle wear or a service, etc. for integrating/controlling/operating home network devices mutually besides wire and wireless network equipment.

In particular, in order to integrate/control/operate home network devices mutually, a UPnP (universal plug and play) comes to the front presently. The UPnP is a common protocol for making several home network devices having different standard specifications interface mutually.

FIG. 1 is an exemplary view illustrating a general UPnP based home network system.

As depicted in FIG. 1, in the home network system, UPnP devices 30, 50 (herein, a UPnP refrigerator and a UPnP computer) and a UPnP CP (control point) device 40 (herein, a UPnP DTV) are connected with each other through one topology, in some cases, the UPnP devices are connected to an ISP (Internet service provider) 10 through a home gateway 20 and receive various Internet services.

Operation processes of the UPnP based home network system will be described with reference to FIG. 2.

FIG. 2 is an exemplary view illustrating operation between a UPnP CP (control point) device and a UPnP device in the general home network system.

First, a DHCP (dynamic host configuration protocol) server allocates an IP (Internet protocol) address to a UPnP device 70 and a UPnP control point device (hereinafter, it is referred to a UPnP CP) 60. Afterward, the UPnP device 70 multicasts a URL indicating a position of UUID (unique universe identifier) data as a device recognition identifier and a position of device information storing data to a home control device. Accordingly, the UPnP CP 60 recognizes the UPnP device 70 through the UUID and requests data indicated by the URL.

In the meantime, the UPnP device 70 transmits description file having various device detailed information, service information and state varied data indicating device state information to the UPnP CP 60 according to the request message.

Accordingly, the UPnP CP 60 can control/operate home network devices connected thereto through the description file, herein, the description file is provided as a xml (extensible markup language) spec.

FIG. 3 is an exemplary view illustrating a request message for UPnP device recognition in a general UPnP CP.

As depicted in FIG. 3, the request message (herein, M-search message) is constructed so as to make a UPnP CP user search or recognize each UPnP device through a device characteristic identifier (herein, ST item).

FIG. 4 is an exemplary view illustrating an advertisement message for notifying a general UPnP device.

As depicted in FIG. 4, the device's advertisement message (herein, a notify message) is transmitted to a UPnP CP user through a device characteristic identifier (herein, a NT item), and accordingly all UPnP CPs in the same local network can recognize and control the pertinent UPnP device.

In more detail, in the general UPnP based home network system, all UPnP devices connected to the local network are shown in the UPnP CP. Accordingly, regardless of user's minds, the UPnP CP user can grasp all information such as existence and state of a specific device in the network. In addition, in order to control the devices, in the most of cases, device recognition is permitted. However, in case of control, a person having administrator's authority can perform control by inputting a password.

In device control, when too many devices are displayed on a screen of the UPnP CP, it may cause user's confusion. In addition, because a UPnP device requiring security or a device not having recognition necessity due to a certain reasons may be displayed on the screen of the UPnP CP, problems related to error operation and security may occur.

SUMMARY OF THE INVENTION

It is an object of the present invention to provide a selective device recognition apparatus in a UPnP based home network and a method thereof capable of varying existence of a specific UPnP device differentially according to a UPnP CP user's authority by providing a network transmission possible indicator to a request message in a UPnP CP, recognizing the network transmission possible indicator with a corresponded UPnP device and displaying it on a UPnP CP user screen.

In order to achieve the above-mentioned object, a selective device recognition apparatus in a UPnP based home network in accordance with the present invention includes a network stream processing unit for parsing a characteristic data stream of a device and reading a pertinent network transmission possible identifier of the device characteristic identifier; and a network transmission judging unit for comparing the read network transmission possible identifier with a preset network transmission possible identifier and judging network transmission of characteristic data according to the comparison result.

In order to achieve the above-mentioned object, a selective device recognition method in a UPnP based home network in accordance with the present invention includes receiving a device characteristic data stream and parsing it; reading a device characteristic identifier and a network transmission possible identifier; and comparing the read network transmission possible identifier with a pre-recorded network transmission possible identifier and judging whether network transmission of characteristic data corresponded to the read device characteristic identifier is performed according to the comparison result.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a flow chart illustrating a method for judging network transmission of device characteristic data in a home network;

FIG. 9 is an exemplary view illustrating a request message for UPnP device recognition in a UPnP CP of a home network system in accordance with the present invention;

FIG. 10 is an exemplary view illustrating a transmission judgement table in accordance with the present invention;

FIG. 12 is an exemplary view illustrating an advertisement message for notifying a device of the home network system in accordance with the present invention;

FIG. 13 is an exemplary view illustrating a transmission judgement table in accordance with the present invention.

DETAILED DESCRIPTION OF THE PREFERRED EMBODIMENT

Hereinafter, the preferred embodiment of the present invention will be described with reference to accompanying drawings.

Figure 1:
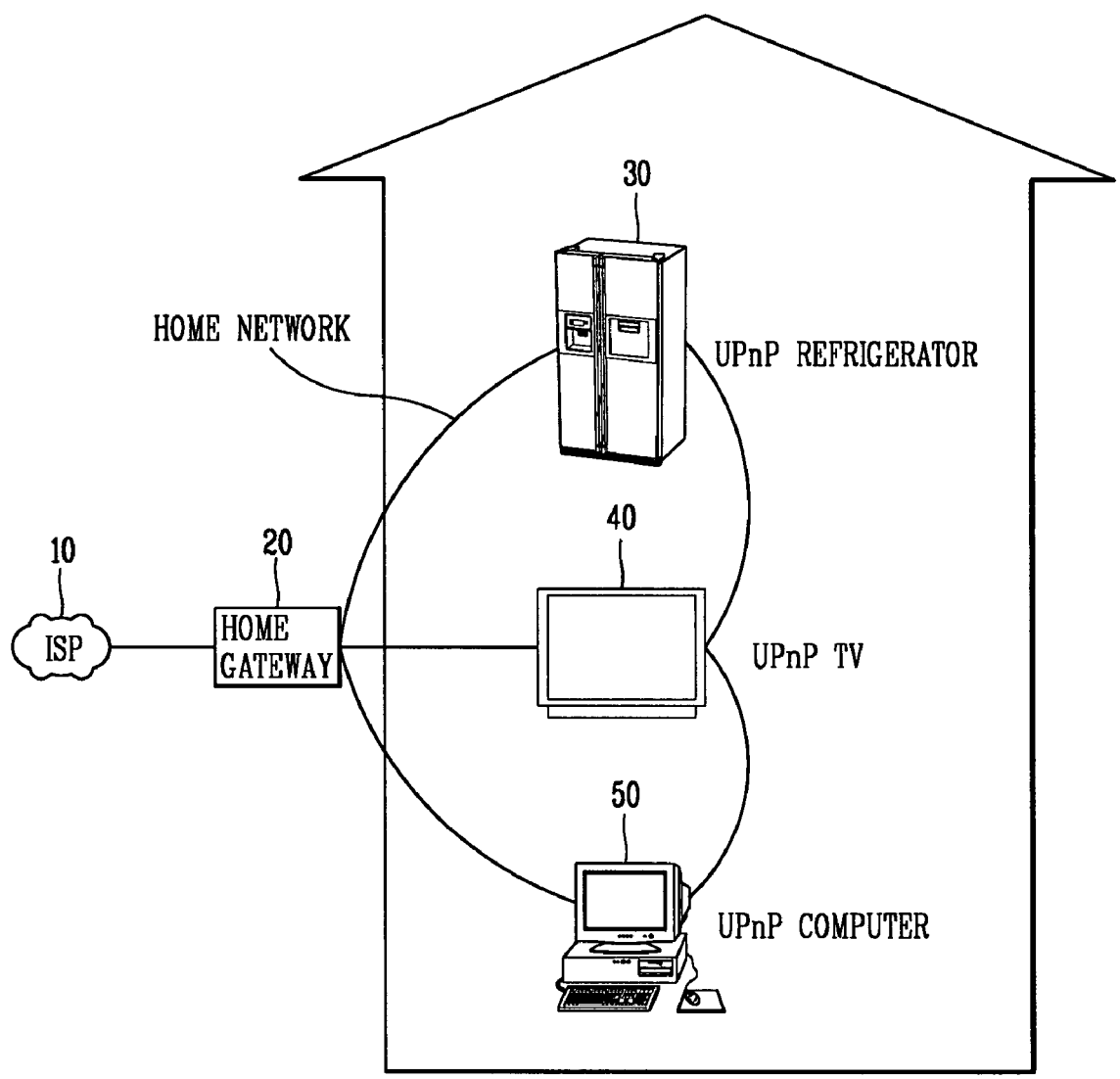
FIG. 1 is an exemplary view illustrating a general UPnP based home network.
Figures 2, 3, 4:
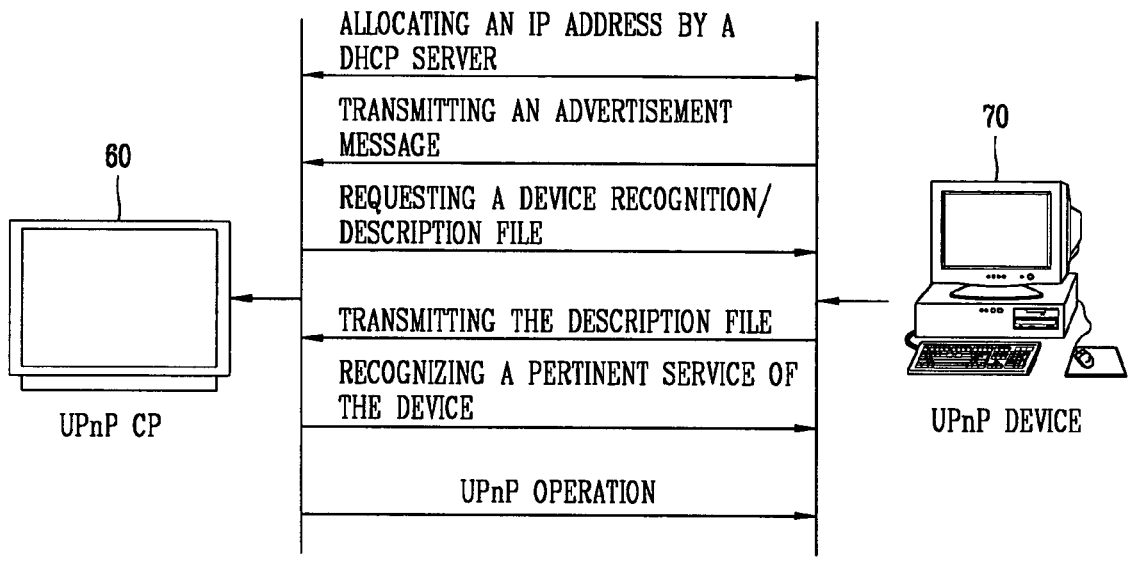
FIG. 2 is an exemplary view illustrating operation between a UPnP CP (control point) device and a UPnP device performed in a general home network system.
FIG. 3 is an exemplary view illustrating a request message for UPnP device recognition in a general UPnP control point.
FIG. 4 is an exemplary view illustrating an advertisement message for notifying a general UPnP device.
Figure 5:
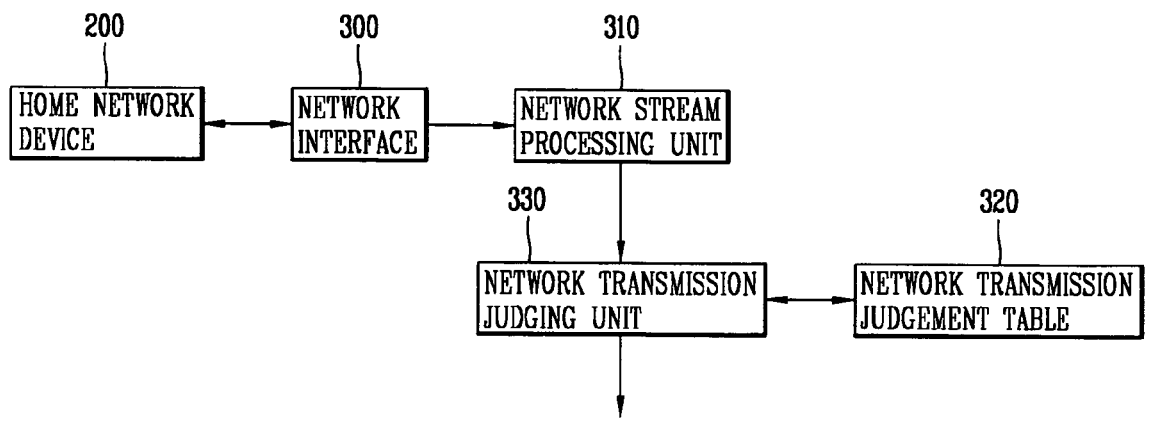
FIG. 5 is a block diagram illustrating an apparatus for judging network transmission of device characteristic data in a home network in accordance with the present invention.

FIG. 5 is a block diagram illustrating an apparatus for judging network transmission of device characteristic data in a home network in accordance with the present invention.

As depicted in FIG. 5, the apparatus includes a network interface 300 for receiving a device characteristic data stream transmitted from a home network device 200 through wire/wireless communication, etc.; a network stream processing unit 310 for reading a device characteristic identifier and a pertinent network transmission possible identifier thereof by parsing the device characteristic data stream received in the network interface 300; a transmission judgement table 320 in which a pertinent network transmission possible identifier is matched-recorded by device characteristic identifiers read in the network stream processing unit 310; and a network transmission judging unit 330 for comparing a transmission possible identifier read in the network stream processing unit 310 with a network transmission possible identifier recorded in the transmission judgement table 320 and judging network transmission of characteristic data corresponded to the device characteristic identifier according to the comparison is result.

Operations of the apparatus will be described.

First, the network interface 300 receives device characteristic data stream transmitted from plural home network devices (UPnP device or UPnP CP) 200 through wire/wireless communication, etc. Herein, the device characteristic data stream is an advertisement data stream of the UPnP device or response data stream transmitted by a request of the UPnP CP. In more detail, in the present invention, the device characteristic identifier and the network transmission possible identifier are received from other home network devices connected to a cable with that kind of data stream field.

Afterward, the network stream processing unit 310 reads the device characteristic identifier and the network transmission possible identifier of the device characteristic data stream by parsing the device characteristic data stream received from the network interface 300.

Lastly, the device characteristic identifier and the pertinent network transmission possible identifier read from the network stream processing unit 310 are sequentially compared with a device characteristic identifier and a network transmission possible identifier preset in the transmission judgement table 320, and it is judged whether the pertinent characteristic data are transmitted according to the comparison result.

Figure 6:
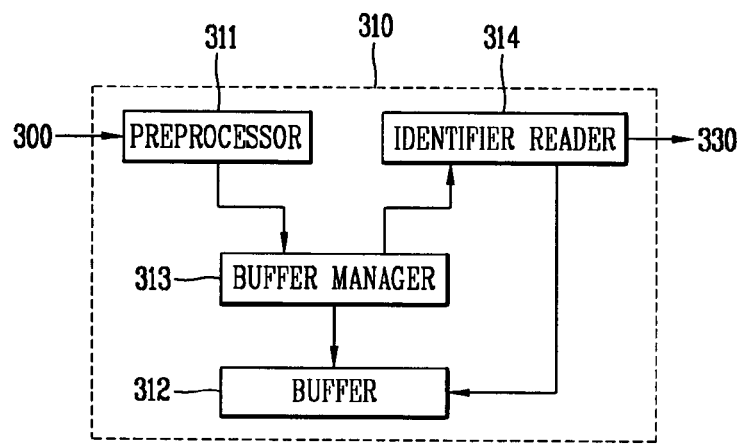
FIG. 6 is a block diagram illustrating a network stream processing unit in accordance with the present invention.

FIG. 6 is a block diagram illustrating a network stream processing unit in accordance with the present invention.

As depicted in FIG. 6, the network stream processing unit 310 includes a preprocessor 311 for parsing a device characteristic data stream received from the network interface 300; a buffer for temporally storing the device characteristic data parsed in the preprocessor 311; a buffer manager 313 for temporally storing the device characteristic data parsed in the preprocessor 311 in the buffer 312 and outputting a registry signal corresponded thereto; and an identifier reader 314 for searching the device characteristic data temporally stored in the buffer 312 according to the registry signal outputted from the buffer manager 313 and reading a device characteristic identifier and a network transmission identifier.

The network stream processing unit 310 will be described in detail.

First, the preprocessor 311 performs parsing of the device characteristic data stream received from the network interface 300 by device characteristic data units divided by a token (/). For example, in a local IP based UPnP, it is preferable to perform parsing by methods such as a /0device characteristic identifier (device type)/ and a /0device type identifier (friendly name)/.

The buffer manager 313 temporally stores the device characteristic data parsed in the preprocessor 311 in the buffer 312 and outputs a registry signal corresponded thereto to the identifier reader 314. The identifier reader 314 searches the device characteristic data stored in the buffer 312 according to the registry signal outputted from the buffer manager 313, reads a device characteristic identifier and a network transmission possible identifier and outputs them to the network transmission judging unit 330.

Figure 7:
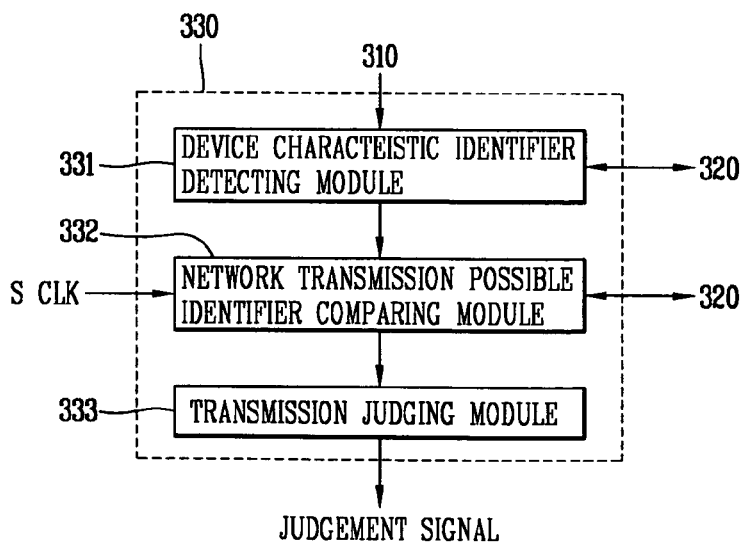
FIG. 7 is a block diagram illustrating a network transmission judging unit in accordance with the present invention.

FIG. 7 is a block diagram illustrating a network transmission judging unit in accordance with the present invention.

As depicted in FIG. 7, the network transmission judging unit 330 includes a device characteristic identifier detecting module 331 for detecting a device characteristic identifier same with the device characteristic identifier read from the network stream processing unit 310 in the transmission judgement table 320; a network transmission possible identifier comparing module 332 for detecting a network transmission possible identifier corresponded to the device characteristic identifier detected in the device characteristic identifier detecting module 331 in the transmission judgement table 320 and comparing it with the network transmission possible identifier read from the network stream processing unit 310; and a transmission judging module 333 for judging whether it is possible to perform network transmission of pertinent characteristic data indicated by the device characteristic identifier according to the comparison result of the network transmission possible identifier comparing module 332.

Accordingly, when the network transmission possible identifier read from the network stream processing unit 310 is not same with the network transmission possible identifier detected in the transmission judgement table 320, a disable signal for not performing transmission of device characteristic data indicated by the device characteristic identifier is outputted to a microcomputer (not shown).

In the meantime, when the network transmission possible identifier read from the network stream processing unit 310 is same with the network transmission possible identifier detected in the transmission judgement table 320, an enable signal for performing transmission of device characteristic data indicated by the device characteristic identifier is outputted to the microcomputer (not shown). Afterward, under the control of the microcomputer, pertinent characteristic data of the device characteristic identifier is read from database (not shown) and is transmitted to a home network device requiring characteristic data of the device characteristic identifier.

FIG. 8 is a flow chart illustrating a method for judging network transmission of device characteristic data in a home network.

As depicted in FIG. 8, the method includes monitoring-receiving a device characteristic data stream transmitted from a home network device through wire/wireless communication, etc. as shown at step S600; parsing the received device characteristic data stream as shown at step S610; reading a device characteristic identifier and a pertinent network transmission possible identifier thereof from the parsed device characteristic data as shown at step S620; comparing the pertinent network transmission possible identifier of the read device characteristic identifier with a network transmission possible identifier recorded in a transmission judgement table as shown at step S630; and judging whether network transmission of characteristic data corresponded to the read device characteristic identifier is performed according to the comparison result as shown at step S640.

FIG. 9 is an exemplary view illustrating a request message for UPnP device recognition in a UPnP CP of a home network system in accordance with the present invention.

As depicted in FIG. 9, the request message (herein, M-search message) includes a specific network transmission possible identification information (herein, PW) by each device characteristic identifier. Accordingly, recognition of a UPnP device corresponded to each network transmission possible identifier is judged in the UPnP CP.

FIG. 10 is an exemplary view illustrating a transmission judgement table in accordance with the present invention.

As depicted in FIG. 10, in the transmission judgment table, inherent network transmission possible identifier information by each device characteristic identifier is preset. For example, a network transmission possible identifier corresponded to a device characteristic identifier UUID is set as SSSSSSS, when the present SSSSSSS is same with a received network transmission identifier, a pertinent device transmits pertinent characteristic data to a home network device indicated by the UUID.

Figure 11:
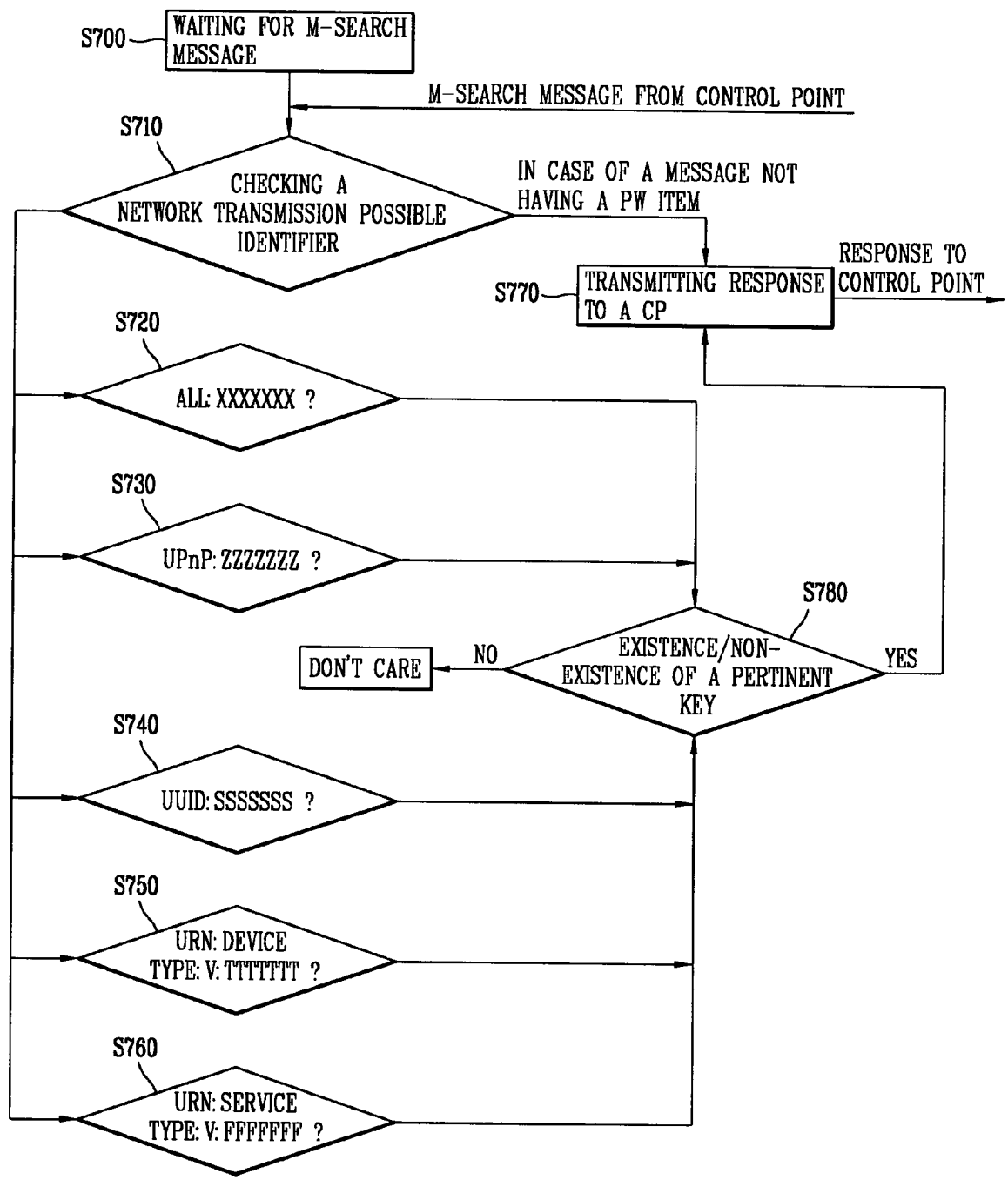
FIG. 11 is a flow chart illustrating operation about a request message in a device of the home network system in accordance with the present invention.

FIG. 11 is a flow chart illustrating operation about a request message in a device of the home network system in accordance with the present invention.

First, the UPnP device waits for a request message (herein, M-search message) from the UPnP CP as shown at step S700.

Afterward, when the request message is received from the UPnP CP, information about the network transmission possible identifier (herein, PW) is checked as shown at step S710. Herein, when there is no information about the network transmission possible identifier, a response message is unconditionally transmitted to the UPnP CP as shown at step S770.

In the meantime, when information about the network transmission possible identifier is detected, each network transmission possible identifier is checked as shown at steps S720~S760, when it is corresponded to each network transmission possible identifier, a pertinent response message is transmitted to the UPnP CP as shown at step S780.

Accordingly, a key value is provided to the UPnP CP according to user authority, and the UPnP CP can freely recognize and control a request device. In the meantime, a user not having a key value can control only a device allocated by capacity or authority thereof, and accordingly safe use of a device can be secured.

FIG. 12 is an exemplary view illustrating an advertisement message for notifying a device of the home network system in accordance with the present invention.

FIG. 13 is an exemplary view illustrating a transmission judgement table in accordance with the present invention.

As depicted in FIGS. 12 and 13, in the device of the home network system, an advertisement message is outputted by adding specific network transmission possible identification information (herein, PW) to each device characteristic identifier. Accordingly, in case of a message not having network transmission possible identifier information, the UPnP CP recognizes a device by a general recognition process, in case of a message having network transmission possible identifier information, only when it is corresponded with a key of the UPnP CP, the UPnP CP receives a pertinent device and a service.

Figure 14:
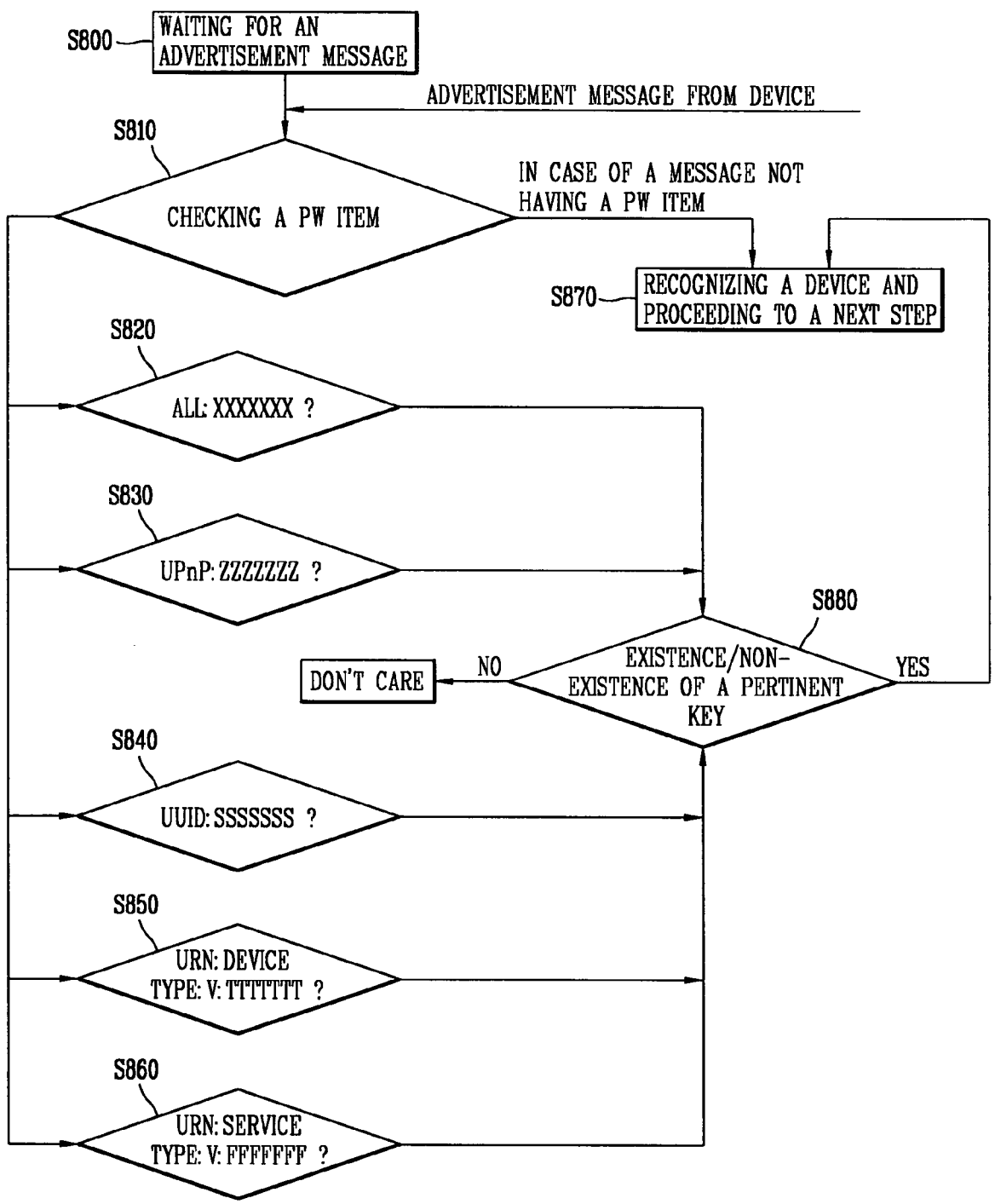
FIG. 14 is a flow chart illustrating operation about an advertisement message in a UPnP CP of the home network system in accordance with the present invention.

FIG. 14 is a flow chart illustrating operation about an advertisement message in a UPnP CP of the home network system in accordance with the present invention.

First, the UPnP CP waits for an advertisement message from a device as shown at step S800.

Afterward, when the advertisement message is received from the device, information about a network transmission possible identifier (herein, PW) is checked as shown at step S810. Herein, when there is no network transmission possible identifier, a pertinent device is unconditionally recognized, and a next step is performed as shown at step S870.

In the meantime, when network transmission possible identifier information is detected, each network transmission possible identifier is checked as shown at step S810~S860, when it is corresponded with each network transmission possible identifier of the UPnP CP, a pertinent device and a service are recognized, and a next step is performed. When network transmission possible identifier information is not detected, a device is not recognized as shown at step S880.

In conclusion, a key value is provided to a device according to user's authority, and accordingly the UPnP CP performs recognition of devices differentially by providing each key value to devices and service items. In addition, a UPnP CP user knowing a key value of a pertinent device and a service can recognize and control a pertinent device easily.

As described-above, in the present invention, by transmitting a network transmission possible identifier set by each device characteristic identifier with a device characteristic data stream transmitted from a home network device and transmitting pertinent characteristic data of the device characteristic identifier by only a home network device recognizing the network transmission possible identifier, a user can recognize the home network device easily. In addition, security about the pertinent device can be selectively performed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A selective device recognition apparatus in a UPnP based home network, the apparatus comprising:
a network stream processing unit configured to parse a device characteristic data of a device and to read a network transmission possible identifier and a device characteristic identifier, the device being automatically detectable in the UPnP based home network, wherein the network transmission possible identifier is set to recognize a device according to a user's authority; and
a network transmission judging unit configured to compare the read network transmission possible identifier with a preset network transmission possible identifier recorded in a transmission judgment table, and to judge whether to perform network transmission of the device characteristic data according to a result of the comparison,
wherein the network transmission judging unit is configured to transmit a disable signal for intercepting a transmission of the device characteristic data only when the network transmission possible identifier read from the network stream processing unit and the preset network transmission possible identifier are different, and to transmit the device characteristic data only when the network transmission possible identifier read from the network stream processing unit is matched with the preset network transmission possible identifier,
wherein the network stream processing unit includes:
a preprocessor configured to parse the device characteristic data;
a buffer manager configured to temporally store the device characteristic data parsed in the preprocessor in a buffer and to output a registry signal corresponded thereto; and
an identifier reader configured to search the device characteristic data temporally stored in the buffer according to the registry signal outputted from the buffer manager and read the device characteristic identifier and the network transmission possible identifier.

2. The apparatus of claim 1, further comprising:
a network interface configured to receive the device characteristic data transmitted from a home network device.

3. The apparatus of claim 1, wherein the preprocessor performs parsing of the device characteristic data by device characteristic data units divided by a token(/).

4. The apparatus of claim 1, wherein the network transmission judging unit includes:

a device characteristic identifier detecting module configured to detect a device characteristic identifier that is the same with the device characteristic identifier read from the network stream processing unit;
a network transmission possible identifier comparing module configured to compare the network transmission possible identifier detected by the device characteristic identifier detecting module with the network transmission possible identifier read from the network stream processing unit; and
a transmission judging module configured to judge whether it is possible to perform the network transmission of the device characteristic data indicated by the device characteristic identifier according to the comparison result.

5. A selective device recognition method in a UPnP based home network, the method comprising:
receiving and parsing a device characteristic data of a device, the device being automatically detectable in the UPnP based home network;
temporally storing the parsed device characteristic data and outputting a registry signal corresponded thereto;
searching the temporally stored parsed device characteristic data according to the outputted registry signal;
reading a device characteristic identifier and a network transmission possible identifier from the searched parsed device characteristic data, wherein the network transmission possible identifier is set to recognize a device according to a user's authority;
comparing the read network transmission possible identifier with a preset network transmission possible identifier recorded in a transmission judgment table, and judging whether to perform network transmission of the device characteristic data corresponded to the read device characteristic identifier is performed according to a result of the comparison; and
transmitting a disable signal for intercepting a transmission of the device characteristic data only when the read network transmission possible identifier and the preset network transmission possible identifier are different, and transmitting the device characteristic data only when the read network transmission possible identifier is matched with the preset network transmission possible identifier.

6. The method of claim 5, wherein parsing the received device characteristic data is performed by device characteristic data units divided by a token(/) or parsing the received device characteristic data is performed by inserting a null string after the token in the parsing step.

7. The method of claim 5, wherein the device characteristic data is a request message for UPnP device recognition in a UPnP CP (control point) device.

8. The method of claim 7, wherein the request message includes inherent network transmission possible identifier information per each device characteristic identifier.

9. The method of claim 7, wherein the UPnP device includes the network transmission possible identifier, and recognition is judged by the UPnP CP device.

10. The method of claim 7, wherein the UPnP CP device and the UPnP device exist in a same local network.

11. The method of claim 5, wherein the device characteristic data is an advertisement message for notifying a UPnP device itself.

12. The method of claim 11, wherein the advertisement message includes inherent network transmission possible identifier information per each device characteristic identifier.

13. The method of claim 5, wherein the network transmission judging step includes:
   outputting a request message to a UPnP CP (control point) device for a message not having network transmission possible identifier information; and
   sequentially comparing each network transmission possible identifier with each network transmission possible identifier of a UPnP device for a message having network transmission possible identifier information and transmitting a response message to the UPnP CP device according to the comparison result.

14. The method of claim 5, wherein the network transmission judging step includes:
   recognizing a UPnP device by a general recognition process for a message not having the network transmission possible identifier information; and
   sequentially comparing the network transmission possible identifier information with a network transmission possible identifier of a UPnP CP device when the network transmission possible identifier information is detected and recognizing a pertinent device and a service according to the comparison result.

15. A selective device recognition apparatus in a UPnP based home network, the apparatus comprising:
   a network stream processing unit configured to parse a device characteristic data of a device and to read a network transmission possible identifier and a device characteristic identifier, wherein the network transmission possible identifier is set to recognize a device according to a user's authority; and
   a network transmission judging unit configured to compare the read network transmission possible identifier with a preset network transmission possible identifier recorded in a transmission judgment table, and to judge whether to perform network transmission of the device characteristic data according to a result of the comparison,
   wherein the device characteristic data is transmitted by only a home network device recognizing the network transmission possible identifier,
   wherein the network transmission judging unit is configured to transmit a disable signal for intercepting a transmission of the device characteristic data only when the network transmission possible identifier read from the network stream processing unit and the preset network transmission possible identifier are different, and to transmit the device characteristic data only when the network transmission possible identifier read from the network stream processing unit is matched with the preset network transmission possible identifier,
   wherein the network stream processing unit includes:
      a preprocessor configured to parse the device characteristic data;
      a buffer manager configured to temporally store the device characteristic data parsed in the preprocessor in a buffer and to output a registry signal corresponded thereto; and
      an identifier reader configured to search the device characteristic data temporally stored in the buffer according to the registry signal outputted from the buffer manager and read the device characteristic identifier and the network transmission possible identifier.

* * * * *